(12) United States Patent
Fukui et al.

(10) Patent No.: US 8,349,491 B2
(45) Date of Patent: *Jan. 8, 2013

(54) LITHIUM SECONDARY BATTERY AND METHOD OF MANUFACTURING THE SAME

(75) Inventors: Atsushi Fukui, Kobe (JP); Taizo Sunano, Kobe (JP); Maruo Kamino, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 450 days.

This patent is subject to a terminal disclaimer.

(21) Appl. No.: 12/385,016

(22) Filed: Mar. 27, 2009

(65) Prior Publication Data

US 2009/0246632 A1    Oct. 1, 2009

(30) Foreign Application Priority Data

Mar. 28, 2008   (JP) ................. 2008-085362

(51) Int. Cl.
*H01M 4/62* (2006.01)
(52) U.S. Cl. ............ 429/217; 429/218.1; 429/247; 429/129; 429/245
(58) Field of Classification Search ........... 429/218.1, 429/217, 247, 129, 245
See application file for complete search history.

(56) References Cited

U.S. PATENT DOCUMENTS 7,297,446 B2 * 11/2007 Fukui et al. ............. 429/233
7,682,744 B2 * 3/2010 Sawa et al. ............. 429/218.1
2008/0124631 A1 * 5/2008 Fukui et al. ............. 429/217

FOREIGN PATENT DOCUMENTS

JP    2000-021412    * 1/2000

| JP | 2002-260637 A | 9/2002 |
| JP | 2007-242405 A | 9/2007 |
| WO | 2004/004031 A1 | 1/2004 |

* cited by examiner

*Primary Examiner* — Laura Weiner
(74) *Attorney, Agent, or Firm* — Kubovcik & Kubovcik

(57) ABSTRACT

A lithium secondary battery contains a negative electrode binder containing a polyimide resin having a structure represented by the following chemical formula (1), and the polyimide resin having a molecular weight distribution such that the weight ratio of a polyimide resin having a molecular weight of less than 100,000 and a polyimide resin having a molecular weight from 100,000 to less than 200,000 is from 50:50 to 90:10:

Chemical formula (1)

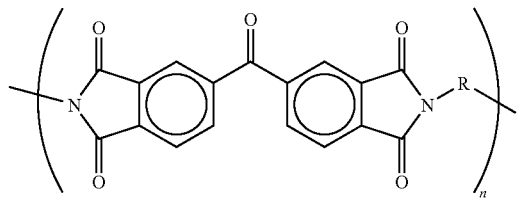

where n is an integer equal to or greater than 1, and R is a functional group represented by the following chemical formula (2) or (3):

Chemical formula (2)

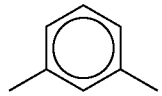

Chemical formula (3)

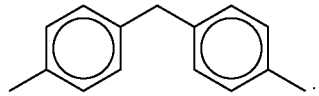

4 Claims, 2 Drawing Sheets

LITHIUM SECONDARY BATTERY AND METHOD OF MANUFACTURING THE SAME

BACKGROUND OF THE INVENTION

1. Field of the Invention

The present invention relates to lithium secondary batteries and methods of manufacturing the batteries.

2. Description of Related Art

Mobile information terminal devices such as mobile telephones, notebook computers, and PDAs have become smaller and lighter at a rapid pace in recent years. This has led to a demand for higher capacity batteries as the drive power source for the mobile information terminal devices. With their high energy density and high capacity, lithium-ion batteries, which perform charge and discharge by transferring lithium ions between the positive and negative electrodes, have been widely used as a driving power source for such mobile information terminal devices.

The mobile information terminal devices tend to have higher power consumption as the functions of the devices, such as moving picture playing functions and gaming functions, increase. It is strongly desired that the lithium-ion batteries that are the drive power source for the devices have further higher capacities and higher performance in order to achieve longer battery life and improved output power. In view of these circumstances, attempts have been made to use as the negative electrode active material an aluminum alloy, a silicon alloy and a tin alloy, which can absorb a large amount of lithium per unit volume, so that the discharge capacity of the lithium secondary battery can be increased.

In the lithium secondary battery that employs the just-described negative electrode active material, however, the negative electrode active material pulverizes or peels off from the negative electrode current collector because the negative electrode active material undergoes a great volumetric change during occlusion and release of lithium. This causes breakage of the current collection structure in the negative electrode. As a consequence, electron conductivity within the negative electrode degrades, and the cycle performance becomes poor.

In view of the problem, Japanese Published Unexamined Patent Application No. 2002-260637 discloses a negative electrode that achieves good cycle performance. This negative electrode is formed by sintering a negative electrode active material layer containing a polyimide binder and a negative electrode active material composed of a material containing silicon under a non-oxidizing atmosphere.

In addition, PCT Publication No. WO2004/004031 and Japanese Published Unexamined Patent Application No. 2007-242405 disclose that the cycle performance can be further improved by varying the type of the polyimide of the negative electrode.

Nevertheless, even with the use of the just-mentioned conventional polyimide resin or the like as the binder, the adhesive strength and the strength of the resin are still insufficient. Consequently, the problem still remains that the current collection performance in the negative electrode degrades (especially, the current collection performance after the initial charge/discharge cycle degrades) and improvements in the initial charge-discharge efficiency, the discharge rate performance, and the cycle performance are insufficient.

Accordingly, it is a primary object of the present invention to provide a lithium secondary battery and a method of manufacturing the battery that can inhibit degradation of the current collection performance in the negative electrode (particularly the degradation of the current collection performance after the initial charge/discharge cycle) and improve the initial charge-discharge efficiency, the discharge rate performance, and the cycle performance.

BRIEF SUMMARY OF THE INVENTION

In order to accomplish the foregoing and other objects, the present invention provides a lithium secondary battery comprising: a positive electrode; a negative electrode comprising a negative electrode current collector and a negative electrode active material layer formed on the negative electrode current collector, the negative electrode active material layer comprising a binder and negative electrode active material particles containing silicon and/or a silicon alloy; a separator interposed between the electrodes; an electrode assembly comprising the positive electrode, the negative electrode, and the separator; and a non-aqueous electrolyte impregnated in the electrode assembly, wherein the negative electrode binder contains a polyimide resin having a structure represented by the following chemical formula (1), and the polyimide resin has a molecular weight distribution such that the weight ratio of a polyimide resin having a molecular weight of less than 100,000 and a polyimide resin having a molecular weight from 100,000 to less than 200,000 is from 50:50 to 90:10:

Chemical formula (1)

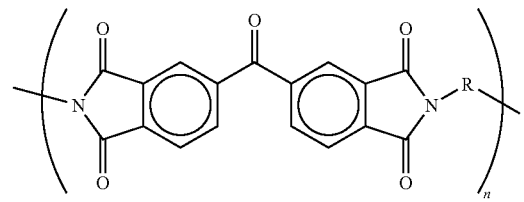

where n is an integer equal to or greater than 1, and R is a functional group represented by the following chemical formula (2) or (3):

Chemical formula (2)

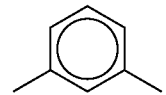

Chemical formula (3)

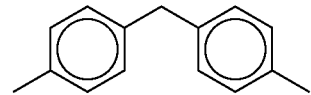

The present invention makes it possible to inhibit degradation of the current collection performance in the negative electrode (particularly the degradation of the current collection performance after the initial charge/discharge cycle) and to improve the initial charge-discharge efficiency, the discharge rate performance, and the cycle performance of the battery.

DETAILED DESCRIPTION OF THE INVENTION

Figure 1:
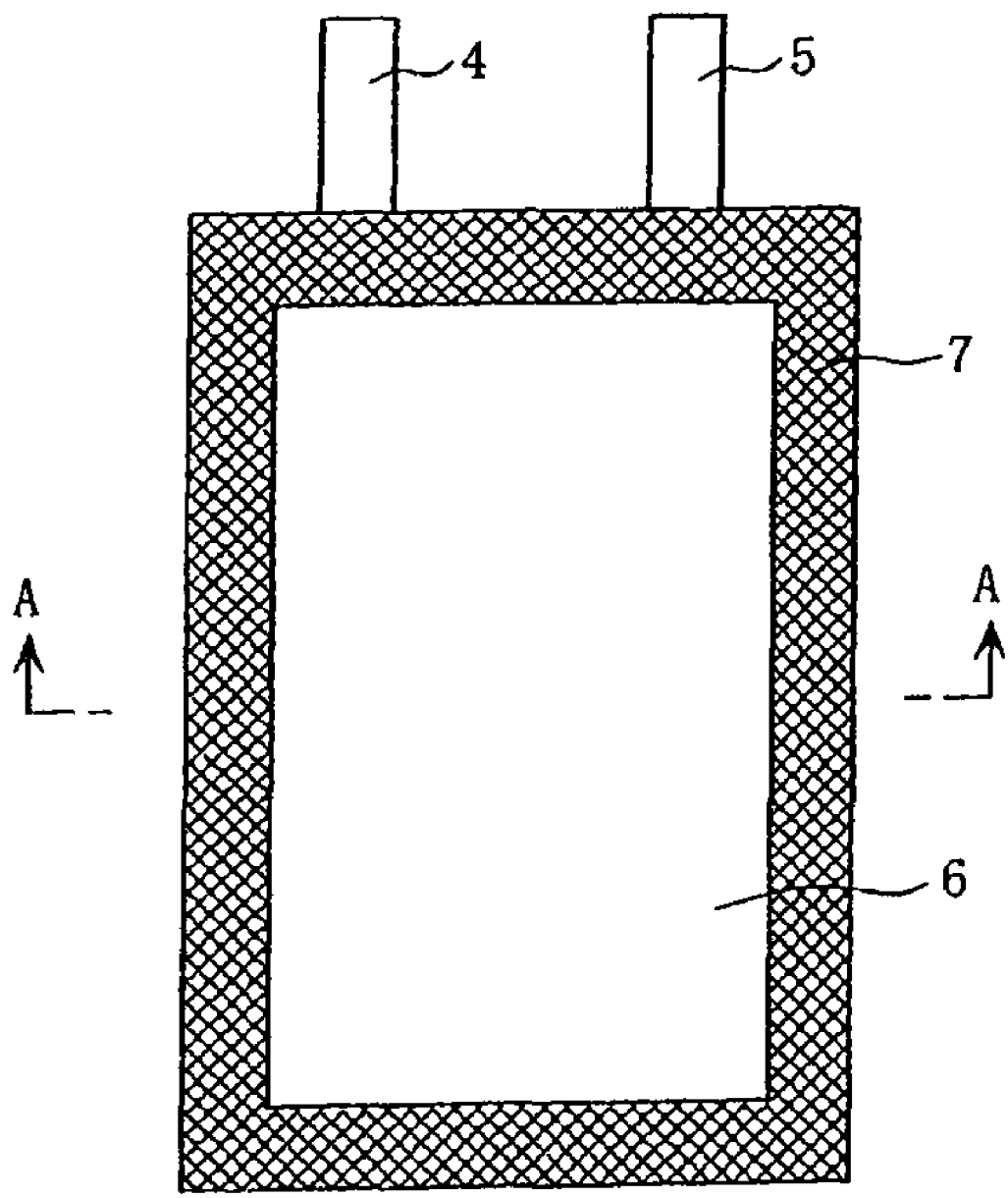
FIG. 1 is a front view of the battery according to one embodiment of the present invention.

A lithium secondary battery according to the present invention includes: a positive electrode; a negative electrode comprising a negative electrode current collector and a negative electrode active material layer formed on the negative electrode current collector, the negative electrode active material layer comprising a binder and negative electrode active material particles containing silicon and/or a silicon alloy; a separator interposed between the electrodes; an electrode assembly comprising the positive electrode, the negative electrode, and the separator; and a non-aqueous electrolyte impregnated in the electrode assembly, wherein the negative electrode binder contains a polyimide resin having a structure represented by the following chemical formula (1), and the polyimide resin has a molecular weight distribution such that the weight ratio of a polyimide resin having a molecular weight of less than 100,000 and a polyimide resin having a molecular weight from 100,000 to less than 200,000 is from 50:50 to 90:10:

Chemical formula (1)

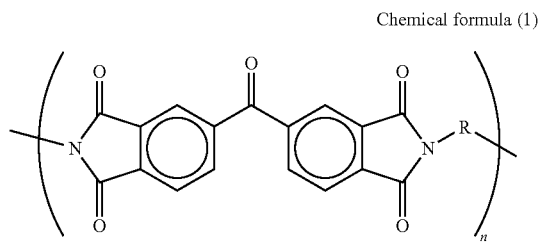

where n is an integer equal to or greater than 1, and R is a functional group represented by the following chemical formula (2) or (3):

Chemical formula (2)

Chemical formula (3)

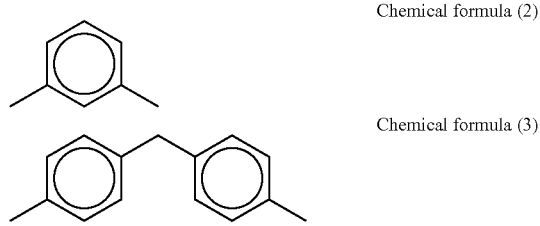

The initial charge-discharge efficiency, the discharge rate performance, and the cycle performance can be improved sufficiently by controlling the molecular structure, weight average molecular weight, and molecular weight distribution of the polyimide resin contained in the negative electrode binder in the manner as described above. The reasons will be described in the following sections separately.

(1) Reason Originating from the Molecular Structure of the Polyimide Resin

When the negative electrode binder contains the polyimide resin having a molecular structure represented by the chemical formula 1, strong adhesion is exhibited in the negative electrode. The reason is that the polyimide resin having the just-described molecular structure shows good adhesion with silicon and/or a silicon alloy, so it can achieve very good adhesion between silicon and/or silicon alloy particles.

(2) Reason Originating from the Weight Average Molecular Weight and Molecular Weight Distribution of the Polyimide Resin When the polyimide resin having the above-described molecular structure is controlled to have a molecular weight distribution such that the weight ratio of a polyimide resin having a molecular weight of less than 100,000 and a polyimide resin having a molecular weight of from 100,000 to less than 200,000 is from 50:50 to 90:10, the distribution of the negative electrode binder in the negative electrode active material layer is adjusted appropriately, and further better adhesion is obtained.

Specifically, the low molecular weight polyimide resin having a molecular weight of less than 100,000 (hereinafter also simply referred to as a "low molecular weight polyimide resin") shows high point binding performance (i.e., exists locally between negative electrode active material particles or between the negative electrode current collector and the negative electrode active material particles) because it has a short chain. Therefore, it secures a portion in which the negative electrode active material particles are directly in contact with one another or with the negative electrode current collector without intervention by the polyimide resin. As a result, it becomes possible to keep the adhesion of the negative electrode active material particles with one another and that of the negative electrode active material particles with the negative electrode current collector without significantly reducing the lithium ion conductivity and electron conductivity in the negative electrode active material layer. On the other hand, the high molecular weight polyimide resin having a molecular weight of from 100,000 to less than 200,000 (hereinafter also simply referred to as a "high molecular weight polyimide resin") has a long chain and shows high strength. Moreover, it can secure strength over the entire negative electrode active material layer because it exists over a wide region in the negative electrode active material layer.

Moreover, since the weight ratio of the low molecular weight polyimide resin and the high molecular weight polyimide resin is controlled to be within the foregoing range, both the advantageous effects resulting from the low molecular weight polyimide resin and those resulting from the high molecular weight polyimide resin can be obtained at the same time. Specifically, if the weight ratio of the high molecular weight polyimide resin is 50% or higher, the surfaces of the negative electrode active material particles and the negative electrode current collector will be covered with the high molecular weight polyimide resin over an excessively wide area, degrading the lithium ion conductivity and electron conductivity within the negative electrode active material layer. On the other hand, if the weight ratio of the high molecular weight polyimide resin is 10% or less, the improvement in the strength of the negative electrode active material layer will not be sufficient, degrading charge-discharge characteristics.

It is desirable that the negative electrode binder have a weight average molecular weight of from 50,000 to less than 150,000.

If the negative electrode binder has a weight average molecular weight of less than 50,000, the proportion of the polyimide resin with a short chain length is too large, and consequently, the binding performance between the negative electrode active material particles with one another or between the negative electrode active material and the negative electrode current collector may become poor. On the other hand, if the negative electrode binder has a weight average molecular weight of greater than 150,000, the proportion of the polyimide resin with a long chain length is too large, and consequently, the lithium ion conductivity and electron conductivity within the negative electrode active material layer may degrade.

It is desirable that the negative electrode current collector comprise copper or a copper alloy.

The above-described polyimide resin has strong adhesion with copper or a copper alloy. Therefore, it becomes possible to improve the adhesion between the negative electrode active material particles and the negative electrode current collector when a copper-based metal foil is used as the negative electrode current collector.

It is desirable that the negative electrode current collector have a surface roughness Ra of 0.2 μm to 0.5 μm.

The reason is as follows. If the surface roughness Ra of the negative electrode current collector surface is less than 0.2 μm, the negative electrode binder will not easily get into the surface irregularities of the negative electrode current collector surface, and the anchoring effect may not be sufficient. As a consequence, the current collection performance in the negative electrode degrades. On the other hand, if the surface roughness Ra of the negative electrode current collector surface exceeds 0.5 μm, too much of the negative electrode binder will get into the irregularities of the negative electrode current collector surface. As a consequence, the amount of the negative electrode binder between the negative electrode active material particles reduces, degrading the adhesion.

Surface roughness Ra is defined in Japanese Industrial Standards JIS B 0601-1994, which will be detailed later.

The present invention also provides a method of manufacturing a lithium secondary battery, comprising the steps of: preparing a negative electrode mixture slurry by dispersing a negative electrode binder precursor and negative electrode active material particles containing silicon and/or a silicon alloy in a solution, the negative electrode binder precursor comprising a first precursor varnish having a structure represented by the following chemical formula (4) and a second precursor varnish having both a structure represented by the following chemical formula (5) and a structure represented by the following chemical formula (6) and/or the following chemical formula (7);

Chemical formula (4)

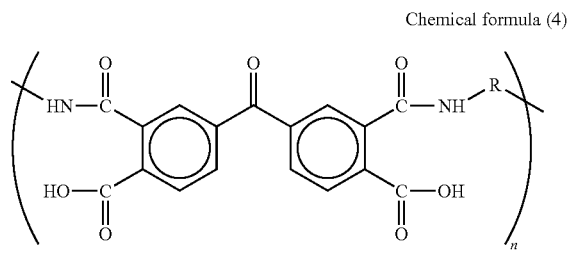

where n is an integer equal to or greater than 1, and R is a functional group represented by the following chemical formula (2) or (3):

Chemical formula (2)

Chemical formula (3)

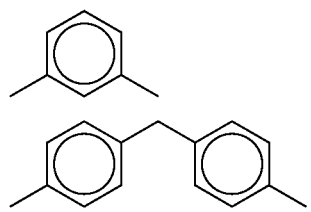

Chemical formula (5)

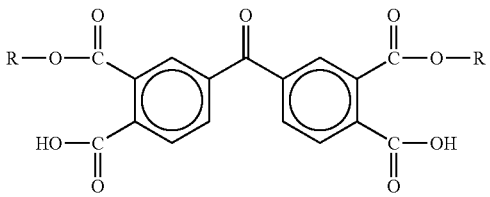

Chemical formula (6)

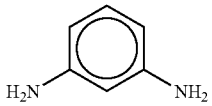

Chemical formula (7)

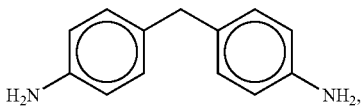

applying the negative electrode active material slurry onto a surface of a negative electrode current collector comprising a conductive metal foil; heat-treating the negative electrode current collector coated with the negative electrode mixture slurry under a non-oxidizing atmosphere to effect imidization of the first precursor varnish so as to prepare a polyimide resin having a molecular weight distribution of from 100,000 to less than 200,000 and to effect polymerization and imidization of the second precursor varnish so as to prepare a polyimide resin having a molecular weight distribution of less than 100,000, thereby preparing a negative electrode containing a polyimide resin having a molecular weight distribution such that the weight ratio of the polyimide resin having a molecular weight of less than 100,000 and the polyimide resin having a molecular weight of from 100,000 to less than 200,000 is from 50:50 to 90:10; providing a positive electrode; interposing a separator between the negative electrode and the positive electrode to prepare an electrode assembly; and impregnating the electrode assembly with a non-aqueous electrolyte.

The second precursor varnish of the negative electrode binder precursor contains the polyimide resin of the chemical formula (1) in monomer form, such as represented by the chemical formulae (5) to (7). Therefore, it can further improve the adhesion of the negative electrode active material particles with one another and the adhesion between the negative electrode active material particles and the negative electrode current collector. The reason is as follows. The resin in monomer form of course has a shorter chain than that in polymer form, and therefore, after it is applied to the current collector, the negative electrode binder precursor tends to get into small irregularities in the surfaces of the negative electrode active material particles easily. Under this condition, adjacent monomers are formed into the polyimide resin through a polymerization reaction and an imidization reaction by the heat treatment. As a result, it becomes possible to obtain a very high anchoring effect.

Miscellaneous

It is preferable that the heating temperature in fabricating the lithium secondary battery according to the present invention be from 300° C. to 450° C. when R in the chemical formula (1) has the chemical formula (2), and that the heating temperature be from 275° C. to 450° C. when R in the chemical formula (1) has the chemical formula (3). Within these temperature ranges, the polymerization reaction and the imidization reaction can take place appropriately. Moreover, the heat treatment in these temperature ranges also causes thermal welding of the negative electrode binder, further improving the adhesion within the negative electrode.

Specifically, the polyimide resin having a structure of the chemical formula (1) has a glass transition temperature of 300° C. when R in the chemical formula (1) has the chemical formula (2), or a glass transition temperature of 275° C. when R in the chemical formula (1) has the chemical formula (3). Accordingly, the polyimide resin shows plasticity in the temperature range above these glass transition temperatures, so the polyimide resin gets into the surface irregularities of the negative electrode active material particles and of the negative electrode current collector to a greater degree, increasing the anchoring effect and improving the adhesion.

However, the polyimide resin having a structure of the chemical formula (1) undergoes thermal decomposition in a temperature range above 450° C. Accordingly, when the heat treatment is carried out at a temperature above 450° C., the strength of the negative electrode binder decreases considerably, reducing the adhesion significantly. For this reason, it is undesirable to carry out the heat treatment at a temperature higher than 450° C.

Hereinbelow, the present invention is described in further detail based on certain embodiments and examples thereof. It should be construed, however, that the present invention is not limited to the following embodiments and examples, but various changes and modifications are possible without departing from the scope of the invention.

Preparation of Negative Electrode (1) Preparation of Silicon Negative Electrode Active Material First, a polycrystalline silicon ingot was prepared by thermal reduction. Specifically, a silicon seed placed in a metal reactor (reducing furnace) was heated to 800° C., and a mixed gas of purified hydrogen and high-purity monosilane ($SiH_4$) gas was flowed therein to deposit polycrystalline silicon on the surface of the silicon seed. Thereby, a polycrystalline silicon ingot formed into a rod shape was prepared.

Next, the polycrystalline silicon ingot was pulverized and classified, whereby polycrystalline silicon particles (negative electrode active material particles) having a purity of 99% were prepared. The polycrystalline silicon particles had a crystallite size of 32 nm and an average particle size of 10 μm.

The crystallite size was calculated from the half-width of silicon (111) peak measured by a powder X-ray diffraction analysis, using Scherrer's formula. The average particle size of the silicon particles was determined by laser diffraction analysis.

(2) Preparation of Negative Electrode Binder Precursor

A precursor varnish a1 for a thermoplastic polyimide resin A1 and a precursor varnish a2 for a thermoplastic polyimide resin A2 were mixed in a weight ratio of 90:10, to prepare a negative electrode binder precursor. The thermoplastic polyimide resin A1 had a weight average molecular weight of $4.5 \times 10^4$ and a molecular weight distribution such that the weight fraction of the polyimide resin having a molecular weight of less than 100,000 was 100%. The thermoplastic polyimide resin A2 had a weight average molecular weight of $15.5 \times 10^4$ and a molecular weight distribution such that the weight fraction of the polyimide resin having a molecular weight of from 100,000 to less than 200,000 was 100%.

Both of the thermoplastic polyimide resins A1 and A2 have a molecular structure represented by the following chemical formula (8). The solvent for both the precursor varnishes a1 and a2 is NMP (N-methyl-2-pyrrolidone), and the concentration thereof is 18 weight %, based on the amount of the polyimide resin after imidization by the heat treatment. The precursor varnishes a1 and a2 are both represented by the following chemical formula (9), and they can be prepared by polymerizing 3,3',4,4'-benzophenone tetracarboxylic dianhydride represented by the following chemical formula (10) and m-phenylenediamine represented by the foregoing chemical formula (6).

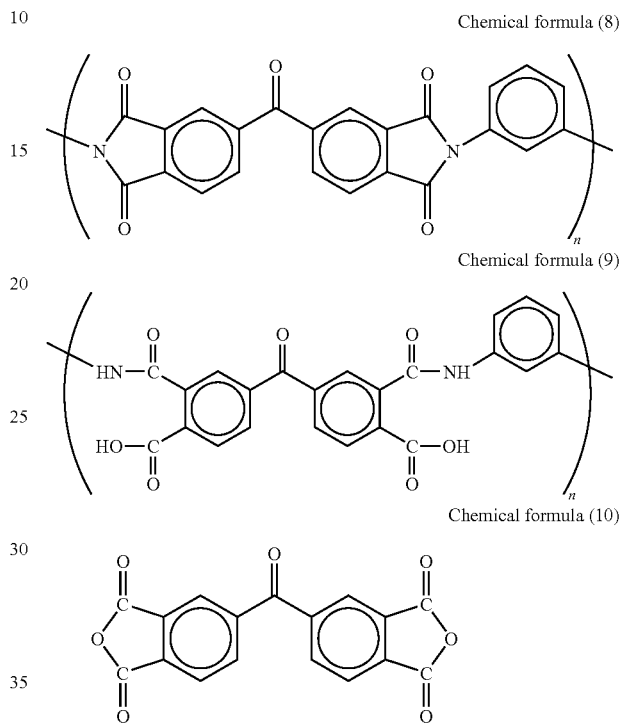

Chemical formula (8)

Chemical formula (9)

Chemical formula (10)

The weight average molecular weight and the molecular weight distribution of the polyimide resins A1 and A2 were obtained as follows. The weight average molecular weight and molecular weight distribution of each of the precursor varnishes a1 and a2 were measured by GPC (gel permeation chromatography). Then, a weight decrease of 4.4 weight % during the imidization (dehydration condensation) by the heat treatment was subtracted from the measured values.

The glass transition temperature of each the thermoplastic the polyimide resins A1 and A2 was 300° C., as determined by DSC (differential scanning calorimetry).

(3) Preparation of Negative Electrode Mixture Slurry

The negative electrode active material particles prepared in the above-described manner, graphite powder (average particle size 3.5 μm) as a negative electrode conductive agent, and the negative electrode binder precursor prepared in the just-described manner were mixed in NMP as a dispersion medium so that the weight ratio of the negative electrode active material powder, the graphite powder, and the polyimide resin after imidization, which was the negative electrode binder (a mixture of the polyimide resins A1 and A2), became 97:3:8.6. Thus, a negative electrode mixture slurry was obtained.

(4) Preparation of Negative Electrode

The just-described negative electrode mixture slurry was applied onto both sides of a negative electrode current collector made of a 18 μm-thick copper alloy foil (C7025 alloy foil, containing 96.2 weight % of Cu, 3 weight % of Ni, 0.65 weight % of Si, and 0.15 weight % of Mg) in the air at 25° C.

The copper alloy foil had been roughened by a copper electroplating process so as to have a surface roughness Ra (defined by Japanese Industrial Standard (JIS) B 0601-1994) of 0.25 μm and a mean spacing of local peaks S (also defined by JIS B 0601-1994) of 0.85 μm. The current collector coated with the slurry was dried in the air at 120° C. and thereafter pressure-rolled in the air at 25° C. Next, the resultant article was cut out into a rectangular shape with a length of 380 mm and a width of 52 mm, and thereafter subjected to a heat treatment at 400° C. for 10 hours under an argon atmosphere, to thus prepare a negative electrode in which a negative electrode active material layer was formed on the surfaces of the negative electrode current collector. Thereafter, a nickel plate serving as a negative electrode current collector tab was connected to an end portion of the negative electrode.

The amount of the negative electrode active material layer was 5.6 mg/cm$^2$, and the thickness thereof was 56 μm. The surface roughness Ra and the mean spacing of local peaks S were measured with a scanning laser microscope.

Preparation of Positive Electrode (1) Preparation of Lithium-Transition Metal Composite Oxide $Li_2CO_3$ and $CoCO_3$ were mixed in a mortar so that the mole ratio of Li and Co became 1:1. Thereafter, the mixture was sintered in an air atmosphere at 800° C. for 24 hours to obtain a lithium-cobalt composite oxide represented as $LiCoO_2$. Next, this was pulverized to prepare a positive electrode active material powder having an average particle size of 11 μm. The resultant positive electrode active material powder had a BET specific surface area of 0.37 m$^2$/g.

(2) Preparation of Positive Electrode

The $LiCoO_2$ powder as the positive electrode active material, carbon black (acetylene black) powder as a positive electrode conductive agent, and polyvinylidene fluoride as a positive electrode binder were added to NMP as a dispersion medium so that the weight ratio of the positive electrode active material, the positive electrode conductive agent, and the positive electrode binder became 95:2.5:2.5. Thereafter, the mixture was kneaded to prepare a positive electrode mixture slurry.

The resultant positive electrode active material slurry was applied onto both sides of a positive electrode current collector made of an aluminum foil (thickness 15 μm, length 377 mm, width 50 mm) so that the length of the applied area was 340 mm on one side and 270 mm on the other side and the width of the applied area was 50 mm on both sides. Thereafter, the positive electrode current collector coated with the positive electrode active material was dried and pressure-rolled, to thus prepare a positive electrode.

The amount of the positive electrode active material layer and the thickness of the positive electrode were 45 mg/cm$^2$ and 143 μm, respectively, measured at the portion where the active material layer was formed on both sides. In addition, an aluminum plate serving as a positive electrode current collector tab was connected to an end portion of the positive electrode on which the positive electrode active material layer was not formed.

Preparation of Non-Aqueous Electrolyte

Lithium hexafluorophosphate ($LiPF_6$) was dissolved at a concentration of 1 mole/L in a mixed solvent of 3:7 volume ratio of ethylene carbonate (EC) and diethyl carbonate (DEC), and thereafter, 0.4 weight % of carbon dioxide and 10 weight % of fluoroethylene carbonate were added thereto, to thus prepare a non-aqueous electrolyte solution.

Preparation of Battery

Figure 2:
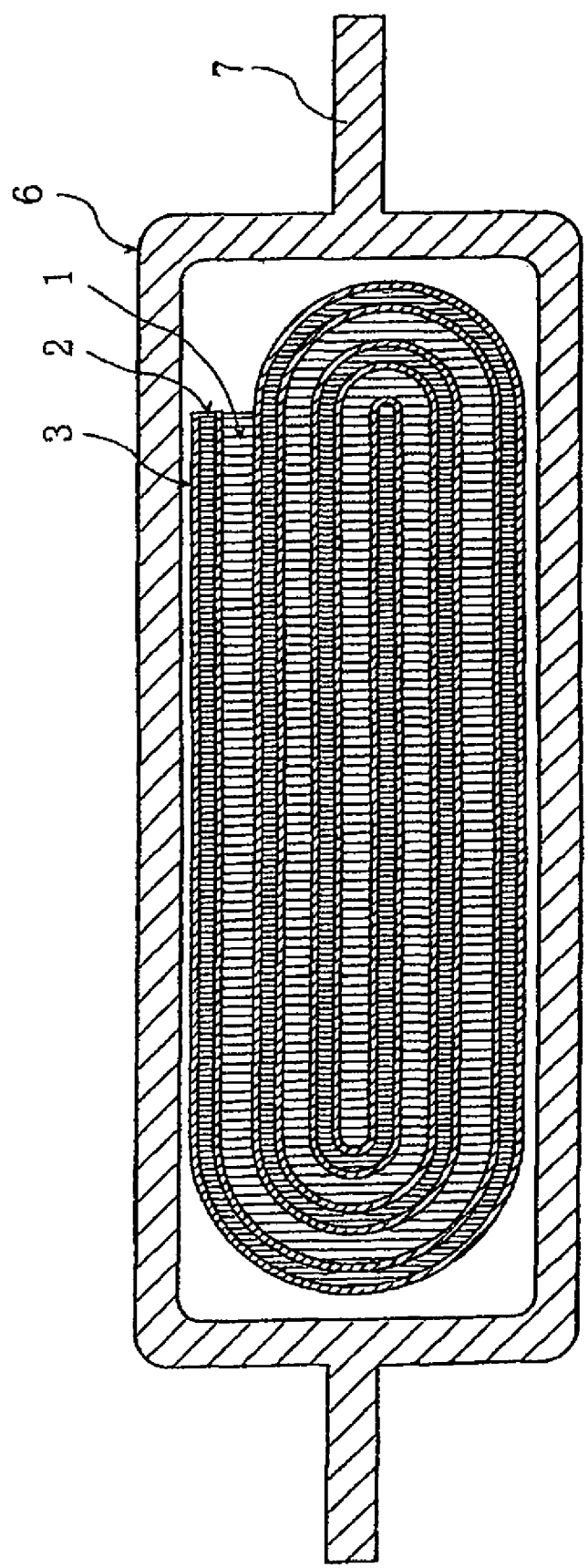
FIG. 2 is a cross-sectional view taken along line A-A in FIG. 1.

Using a sheet of the above-described positive electrode, a sheet of the above-described negative electrode, and two sheets of separators made of a microporous polyethylene film (penetration resistance: 340 g, porosity: 39%) having a thickness of 20 μm, a length of 450 mm, and a width of 54.5 mm, the positive electrode and the negative electrode were disposed facing each other with a sheet of the separator interposed between them, and the positive and negative electrodes with the separators were spirally wound using a winding core having a diameter of 18 mm so that both the positive electrode tab and the negative electrode tab are located at the outermost roll. Subsequently, the winding core was drawn out to prepare a spirally-wound electrode assembly, and then, the spirally-wound electrode assembly was compressed to obtain a flat-type electrode assembly. Lastly, the flat-type electrode assembly and the electrolyte solution prepared in the above-described manner were put into an aluminum laminate battery case in a $CO_2$ atmosphere at 25° C. and 1 atm, to prepare a flat-type battery having a structure as shown in FIGS. 1 and 2.

The specific structure of the lithium secondary battery is as follows. As illustrated in FIGS. 1 and 2, a positive electrode 1 and a negative electrode 2 are disposed so as to oppose each other across a separator 3. The non-aqueous electrolyte solution is impregnated in a flat-type electrode assembly comprising the positive electrode 1, the negative electrode 2, and the separator 3. The positive electrode 1 and the negative electrode 2 are connected to a positive electrode current collector tab 4 and a negative electrode current collector tab 5, respectively, so as to form a structure that enables charging and discharging as a secondary battery. The electrode assembly is disposed in a space within an aluminum laminate battery case 6 having a sealed part 7, at which opposing peripheral edges of the aluminum laminate are heat sealed.

EXAMPLES

First Group of Examples

Example 1-1

A battery prepared in the same manner described in the foregoing embodiment was used for Example 1-1.

The battery fabricated in this manner is hereinafter referred to as Battery A1 of the invention.

Examples 1-2 and 1-3

Two types of batteries were fabricated in the same manner as described in Example 1-1 above, except that the weight ratios of the precursor varnish a1 and the precursor varnish a2 were set at 70:30 and 50:50, respectively.

The batteries fabricated in this manner are hereinafter referred to as Batteries A2 and A3 of the invention, respectively.

Comparative Examples 1-1 to 1-3

Three types of batteries were fabricated in the same manner as described in Example 1-1 above, except that the weight ratios of the precursor varnish a1 and the precursor varnish a2 were set at 100:0, 30:70, and 0:100, respectively.

The batteries fabricated in this manner are hereinafter referred to as Comparative Batteries X1, X2, and X3, respectively.

Example 2-1

Preparation of Negative Electrode Binder Precursor

A precursor varnish b1 for a thermoplastic polyimide resin B1 and a precursor varnish b2 for a thermoplastic polyimide resin B2 were mixed in a weight ratio of 90:10, to obtain a negative electrode binder precursor. The thermoplastic polyimide resin B1 had a weight average molecular weight of $6.2 \times 10^4$ and a molecular weight distribution such that the weight fraction of the polyimide resin having a molecular weight of less than 100,000 was 100%, and the thermoplastic polyimide resin B2 had a weight average molecular weight of $16.7 \times 10^4$ and a molecular weight distribution such that the weight fraction of the polyimide resin having a molecular weight of from 100,000 to less than 200,000 was 100%.

Both of the thermoplastic polyimide resins B1 and B2 have a molecular structure represented by the following chemical formula (11). The solvent for both the precursor varnishes b1 and b2 is NMP (N-methyl-2-pyrrolidone), and the concentration thereof is 18 weight %, based on the amount of the polyimide resin after imidization by the heat treatment. The precursor varnishes b1 and b2 are both represented by the following chemical formula (12), and they can be prepared by polymerizing 3,3',4,4'-benzophenone tetracarboxylic dianhydride represented by the foregoing chemical formula (10) and 4'4-methylenedianiline represented by the foregoing chemical formula (7).

Examples 2-2 and 2-3

Two types of batteries were fabricated in the same manner as described in Example 2-1 above, except that the weight ratios of the precursor varnish b1 and the precursor varnish b2 were set at 70:30 and 50:50, respectively.

The batteries fabricated in this manner are hereinafter referred to as Batteries B1 and B2 of the invention, respectively.

Comparative Examples 2-1 to 2-3

Three types of batteries were fabricated in the same manner as described in Example 2-1 above, except that the weight ratios of the precursor varnish b1 and the precursor varnish b2 were set at 100:0, 30:70, and 0:100, respectively.

The batteries fabricated in this manner are hereinafter referred to as Comparative Batteries Y1, Y2, and Y3, respectively.

Comparative Example 3-1

Preparation of Negative Electrode Binder Precursor

A 8 weight % NMP solution c1 of polyvinylidene fluoride (PVdF) C1 and a 8 weight % NMP solution c2 of polyvinylidene fluoride C2 were mixed in a weight ratio of 90:10, to prepare a negative electrode binder precursor. The polyvi-

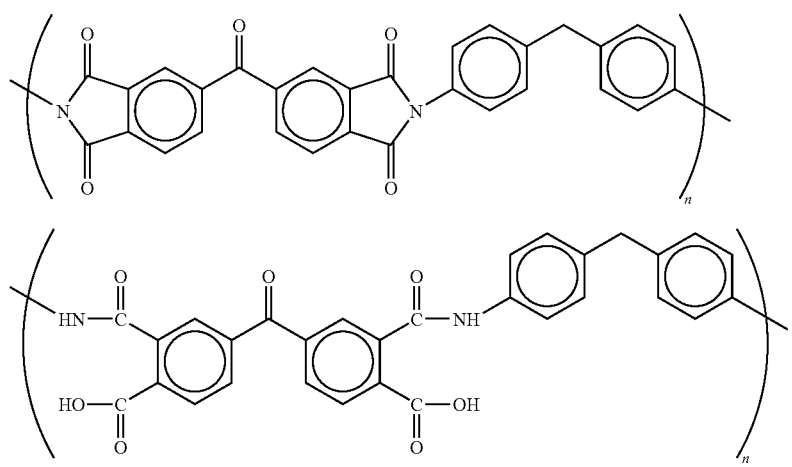

Chemical formula (11)

Chemical formula (12)

The weight average molecular weight and the molecular weight distribution of the polyimide resins B1 and B2 were obtained as follows. The weight average molecular weight and molecular weight distribution of each of the precursor varnishes b1 and b2 were measured by GPC. Then, a weight decrease of 3.6 weight % during the imidization (dehydration condensation) by the heat treatment was subtracted from the measured values.

The glass transition temperature of each the thermoplastic the polyimide resins B1 and B2 was 275° C., as determined by DSC.

Preparation of Battery

A battery was fabricated in the same manner as described in Example 1-1 above, except that the negative electrode binder precursor prepared in the above-described manner was used as the negative electrode binder precursor.

The battery fabricated in this manner is hereinafter referred to as Battery B1 of the invention.

nylidene fluoride (PVdF) C1 had a weight average molecular weight of $6.8 \times 10^4$ and a molecular weight distribution such that the weight fraction of the substance having a molecular weight less than 100,000 was 100%. The polyvinylidene fluoride C2 had a weight average molecular weight of $14.5 \times 10^4$ and a molecular weight distribution such that the weight fraction of the substance having a molecular weight of from 100,000 to less than 200,000 was 100%.

The weight average molecular weight and molecular weight distribution of the polyvinylidene fluorides C1 and C2 were obtained by measuring the weight average molecular weight and the molecular weight distribution of the NMP solutions c1 and c2 by GPC. The melting points of the polyvinylidene fluorides C1 and C2 were 161° C. and 170° C., respectively, as determined by DSC.

Preparation of Battery

A battery was fabricated in the same manner as described in Example 1-1 above, except that the negative electrode binder precursor prepared in the above-described manner was used as the negative electrode binder precursor.

The battery fabricated in this manner is hereinafter referred to as Comparative Battery Z1.

Comparative Examples 3-2 to 3-6

Five types of batteries were fabricated in the same manner as described in Comparative Example 3-1 above, except that the weight ratios of the NMP solution c1 and the NMP solution c2 were set at 100:0, 70:30, 50:50, 30:70, and 0:100, respectively.

The batteries fabricated in this manner are hereinafter referred to as Comparative Batteries Z2 to Z6, respectively.

Experiment

Batteries A1 to A3 and B1 to B3 as well as Comparative Batteries X1 to X3, Y1 to Y3, and Z1 to Z4 were charged and discharged under the following charge-discharge conditions to evaluate the charge-discharge cycle characteristics (initial charge-discharge efficiency, discharge rate performance, and cycle life). The results are shown in Table 1 below. It should be noted that in Table 1, the initial charge-discharge efficiency, discharge rate performance, and cycle life for each of the batteries are expressed by index numbers relative to those values of Battery A1 of the invention, which are taken as 100.

Charge-Discharge Cycle Conditions

Charge Conditions for the First Cycle

Each of the batteries was charged at a constant current of 45 mA for 4 hours, thereafter charged at a constant current of 180 mA until the battery voltage reached 4.2 V, and further charged at a constant voltage of 4.2 V until the current value reached 45 mA.

Discharge Conditions for the First Cycle

Each of the batteries was discharged at a constant current of 180 mA until the battery voltage reached 2.75 V.

Charge Conditions for the Second Cycle Onward

Each of the batteries was charged at a constant current of 900 mA until the battery voltage reached 4.2 V and thereafter charged at a constant voltage of 4.2 V until the current value reached 45 mA.

Discharge Conditions for the Second Cycle Onward

Each of the batteries was discharged at a constant current of 900 mA until the battery voltage reached 2.75 V.

Calculation Method for Initial Charge-Discharge Efficiency, Discharge Rate Performance, and Cycle Life Initial charge-discharge efficiency=(Discharge capacity at the first cycle)/(Charge capacity at the first cycle)×100

Discharge rate performance=(Discharge capacity at the 2nd cycle)/(Discharge capacity at the first cycle)×100

The cycle life is defined as the number of cycles at which the capacity retention ratio (a value obtained by dividing the discharge capacity at the n-th cycle by the discharge capacity at the 2nd cycle) of the battery has reached 50%.

TABLE 1

| | Negative electrode binder | | | | | | |
|---|---|---|---|---|---|---|---|
| | | | | Molecular weight distribution (weight fraction) | | | |
| Battery | Molecular structure | Weight average molecular weight | Less than 100,000 | From 100,000 to less than 200,000 | Initial charge-discharge efficiency | Discharge rate performance | Cycle life |
| X1 | Chemical Formula (8) | $4.5 \times 10^4$ | 100% | 0% | 98 | 99 | 92 |
| A1 | | $7.5 \times 10^4$ | 90% | 10% | 100 | 100 | 100 |
| A2 | | $11.1 \times 10^4$ | 70% | 30% | 101 | 99 | 104 |
| A3 | | $13.0 \times 10^4$ | 50% | 50% | 99 | 98 | 102 |
| X2 | | $14.3 \times 10^4$ | 30% | 70% | 94 | 93 | 100 |
| X3 | | $15.5 \times 10^4$ | 0% | 100% | 91 | 92 | 101 |
| Y1 | Chemical Formula (11) | $6.2 \times 10^4$ | 100% | 0% | 97 | 94 | 93 |
| B1 | | $8.6 \times 10^4$ | 90% | 10% | 99 | 97 | 102 |
| B2 | | $11.8 \times 10^4$ | 70% | 30% | 102 | 97 | 103 |
| B3 | | $13.9 \times 10^4$ | 50% | 50% | 100 | 95 | 107 |
| Y2 | | $15.3 \times 10^4$ | 30% | 70% | 93 | 88 | 101 |
| Y3 | | $16.7 \times 10^4$ | 0% | 100% | 87 | 86 | 102 |
| Z2 | PVdF | $6.8 \times 10^4$ | 100% | 0% | 100 | 101 | 33 |
| Z1 | | $8.3 \times 10^4$ | 90% | 10% | 98 | 98 | 35 |
| Z3 | | $10.5 \times 10^4$ | 70% | 30% | 96 | 99 | 35 |
| Z4 | | $12.0 \times 10^4$ | 50% | 50% | 97 | 98 | 36 |
| Z5 | | $13.2 \times 10^4$ | 30% | 70% | 98 | 99 | 37 |
| Z6 | | $14.5 \times 10^4$ | 0% | 100% | 99 | 100 | 37 |

As clearly seen from Table 1, Batteries A1 to A3 and B1 to B3 of the invention achieved high levels of initial charge-discharge efficiency, discharge rate performance, and cycle life (all the values were 95 or greater). On the other hand, it is observed that in Comparative Batteries X1 to X3 and Y1 to Y3, at least one of the characteristics, initial charge-discharge efficiency, discharge rate performance, and cycle life, was less than 95.

The reason is believed to be as follows. In Batteries A1 to A3 and B1 to B3 of the invention, the molecular weight distribution of the negative electrode binder is such that the polyimide resin with a short chain length, having a molecular weight of less than 100,000, and the polyimide resin with a long chain, having a molecular weight of from 100,000 to less than 200,000, are mixed in a weight ratio of from 50:50 to 90:10. Therefore, the distribution of the negative electrode binder in the negative electrode active material layer is adjusted appropriately, and a high level of adhesion is exhibited in the negative electrode active material layer.

Also as clearly seen from Table 1, Comparative Batteries Z1, Z3, and Z4 showed very short cycle life, although they employed the negative electrode binders that had a weight average molecular weight of from 50,000 to less than 150,000 and had a molecular weight distribution such that the weight ratio of the polyimide resin having a molecular weight of less than 100,000 and the polyimide resin having a molecular weight of from 100,000 to less than 200,000 was from 50:50 to 90:10. It is believed that this was because Comparative Batteries Z1, Z3, and Z4 used polyvinylidene fluoride (a substance that does not have a structure the foregoing chemical formula (1)) as the negative electrode binder. Specifically, polyvinylidene fluoride has poorer adhesion with the silicon particles and the copper alloy than the negative electrode binder having a structure represented by the chemical formula (1). Therefore, destruction of the structure of the negative electrode active material layer occurs when the silicon active material particles undergo volumetric changes in association with charge-discharge operations. As a consequence, the adjusting of the distribution of the negative electrode binder in the negative electrode active material layer did not lead to the effect of improving the current collection performance.

Second Group of Examples

Example 1

Preparation of Negative Electrode Binder Precursor

A precursor varnish a3 (the solvent was NMP and the concentration thereof was 46 weight % based on the amount of the polyimide resin after polymerization and imidization by the heat treatment) for a thermoplastic polyimide resin A3 was mixed with the previously-described precursor varnish a2 for the thermoplastic polyimide resin A2 so that the weight ratio of the polyimide resin A3 and the polyimide resin A2 after polymerization and imidization by the heat treatment became 90:10. The thermoplastic polyimide resin A3 had a weight average molecular weight of $4.2 \times 10^4$ and a molecular weight distribution such that the weight fraction of the polyimide resin having a molecular weight of less than 100,000 was 100%. Thus, a negative electrode binder precursor was prepared.

The precursor varnish a3 is a monomer form of a polymer represented by the foregoing chemical formula (8), which is prepared by dissolving diethyl ester of 3,3'4,4'-benzophenone tetracarboxylic acid represented by the following chemical formula (13) and m-phenylenediamine represented by the foregoing chemical formula (6) into NMP as the solvent.

Chemical formula (13)

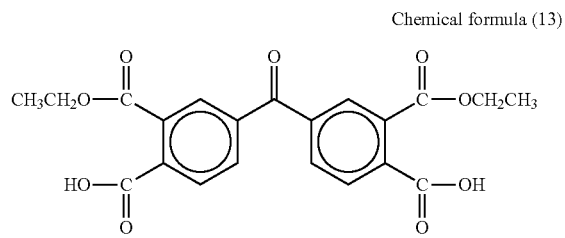

Preparation of Battery

A battery was fabricated in the same manner as described in Example 1-1 of the First Group of Examples above, except that the negative electrode binder precursor prepared in the above-described manner was used when preparing the negative electrode slurry.

The battery fabricated in this manner is hereinafter referred to as Battery A4 of the invention.

Example 2

Preparation of Negative Electrode Binder Precursor

A precursor varnish b3 (the solvent was NMP and the concentration thereof was 46 weight % based on the amount of the polyimide resin after polymerization and imidization by the heat treatment) for a thermoplastic polyimide resin B3 was mixed with the previously-described precursor varnish b2 for the thermoplastic polyimide resin B2 so that the weight ratio of the polyimide resin B3 and the polyimide resin B2 after polymerization and imidization by the heat treatment became 90:10. The thermoplastic polyimide resin B3 had a weight average molecular weight of $5.8 \times 10^4$ and a molecular weight distribution such that the weight fraction of the polyimide resin having a molecular weight of less than 100,000 was 100%. Thus, a negative electrode binder precursor was prepared.

The precursor varnish b3 is a monomer form of a polymer represented by the foregoing chemical formula (11), which is prepared by dissolving diethyl ester of 3,3'4,4'-benzophenone tetracarboxylic acid represented by the foregoing chemical formula (13) and 4,4'-methylenedianiline represented by the foregoing chemical formula (7) into NMP as the solvent.

Preparation of Battery

A battery was fabricated in the same manner as described in Example 1-1 of the First Group of Examples above, except that the negative electrode binder precursor prepared in the above-described manner was used when preparing the negative electrode slurry.

The battery fabricated in this manner is hereinafter referred to as Battery B4 of the invention.

Experiment

The initial charge-discharge efficiency, discharge rate performance, and cycle life were determined for each of Batteries A4 and B4 of the invention under the same conditions as in the experiment for the first group of examples. The results are shown in Table 2 below.

It should be noted that in Table 2, the initial charge-discharge efficiency, discharge rate performance, and cycle life for each of the batteries are expressed by index numbers relative to those values of Battery A1 of the invention, which are taken as 100

TABLE 2

| Battery | Molecular structure | Weight average molecular weight | Molecular weight distribution (weight fraction) | | Presence of substance in monomer form in precursor | Initial charge-discharge efficiency | Discharge rate performance | Cycle life |
|---|---|---|---|---|---|---|---|---|
| | | | Less than 100,000 | From 100,000 to less than 200,000 | | | | |
| A1 | Chemical Formula (8) | $7.5 \times 10^4$ | 90% | 10% | No | 100 | 100 | 100 |
| A4 | | | | | Yes | 101 | 103 | 101 |
| B1 | Chemical Formula (11) | $8.6 \times 10^4$ | | | No | 99 | 97 | 102 |
| B4 | | | | | Yes | 102 | 101 | 102 |

As clearly seen from Table 2, Batteries A4 and B4 of the invention, which employed a negative electrode binder precursor containing a precursor in monomer form, exhibited better initial charge-discharge efficiency and discharge rate performance than Batteries A1 and B1 of the invention, which employed a negative electrode binder precursor entirely made of a precursor in polymer form and containing no precursor in monomer form.

The reason is believed to be as follows. In Batteries A4 and B4 of the invention, the negative electrode binder precursor in monomer form has a short chain, so it tends to get into small irregularities existing in the surfaces of negative electrode active material particles more easily than the negative electrode binder precursor in polymer form. Then, under this condition, formation of the polyimide resin takes places through polymerization and imidization reactions by the heat treatment. As a result, it is believed that a greater degree of anchoring effect was obtained, and stronger adhesion was obtained.

Third Group of Examples

Examples 1 to 4

Four types of batteries were fabricated in the same manner as described in Example 1-1 of the First Group of Examples, except that the surface roughness Ra of the negative electrode current collector was varied to be 0.1 μm, 0.2 μm, 0.5 μm, and 1.0 μm by varying the conditions of the copper electroplating process.

The batteries fabricated in this manner are hereinafter referred to as Batteries A5 to A8 of the invention, respectively.

Experiment

The initial charge-discharge efficiency, discharge rate performance, and cycle life were determined for each of Batteries A5 to A8 of the invention under the same conditions as in the experiment for the first group of examples. The results are shown in Table 3 below.

It should be noted that in Table 3, the initial charge-discharge efficiency, discharge rate performance, and cycle life for each of the batteries are expressed by index numbers relative to those values of Battery A1 of the invention, which are taken as 100.

TABLE 3

| Battery | Molecular structure | Weight average molecular weight | Molecular weight distribution (weight fraction) | | Negative electrode current collector surface roughness Ra (μm) | Initial charge-discharge efficiency | Discharge rate performance | Cycle life |
|---|---|---|---|---|---|---|---|---|
| | | | Less than 100,000 | From 100,000 to less than 200,000 | | | | |
| A5 | Chemical Formula (8) | $7.5 \times 10^4$ | 90% | 10% | 0.1 | 97 | 96 | 96 |
| A6 | | | | | 0.2 | 100 | 99 | 99 |
| A1 | | | | | 0.25 | 100 | 100 | 100 |
| A7 | | | | | 0.5 | 101 | 99 | 102 |
| A8 | | | | | 1.0 | 99 | 97 | 95 |

As clearly seen from Table 3, Batteries A1, A6, and A7 of the invention, in which the negative electrode current collector had a surface roughness Ra of from 0.2 μm to 0.5 μm, exhibited better charge-discharge characteristics than Batteries A5 and A8 of the invention, in which the surface roughness Ra of the negative electrode current collector was outside the just-mentioned range.

The reason is believed to be as follows. In Battery A5 of the invention, the surface roughness Ra of the negative electrode current collector is so small that the binder cannot get into the surface irregularities of the negative electrode current collector sufficiently. Therefore, the anchoring effect cannot be exhibited sufficiently. Consequently, the adhesion reduces. On the other hand, in Battery A8 of the invention, the surface roughness Ra of the negative electrode current collector is excessively large, so that too much of the binder gets into the surface irregularities of the negative electrode current collector. As a consequence, the amount of the binder between the negative electrode active material particles reduces, lowering the adhesion.

Miscellaneous

The calculation method for the degree (n) of polymerization of the polyimide resins represented by the chemical formula (8) and the chemical formula (11) and the like will be discussed below.

(1) The molecular weights of the polyimide resins represented by the chemical formula (8) and the chemical formula (11) per monomer are as shown in Table 4 below. Specifically, the numbers of atoms (C, O, N, H) per monomer were determined for each of the polyimide resins, and the obtained values were multiplied by the respective atomic weights (C: 12.01, O: 16, N: 14.01, H: 1.008), the results of which were then summed.

TABLE 4

| | | Chemical formula (8) | Chemical formula (11) |
|---|---|---|---|
| Number of atoms per monomer | C | 23 | 30 |
| | O | 5 | 5 |
| | N | 2 | 2 |
| | H | 10 | 16 |
| Molecular weight of monomer | | 394.33 | 484.45 |

(2) The ends (terminal end of polymerization) of the polyimide resins represented by the chemical formula (8) and the chemical formula (11) are an O atom on the acid dianhydride side (the left side end of the chemical formula (8) and the chemical formula (11)) instead of the N atom, and $NH_2$ on the diamine side (the right side end of the chemical formula (8) and the chemical formula (11)). Accordingly, the molecular weight of the polyimide resin can be obtained by the following equation (1).

Molecular weight of polyimide resin=(Molecular weight of monomer×Degree (n) of polymerization)+(Total of the atomic weights of the two H atoms and one O atom that are present in excess at the ends [18.016]). Eq. (1)

Rearranging the equation (1) yields the following equation (2), making it possible to calculate the degree (n) of polymerization.

Degree (n) of polymerization=(Molecular weight of polyimide resin−18.016)/Molecular weight of monomer Eq. (2)

Table 5 shows the degrees (n) of polymerization at typical molecular weights.

TABLE 5

| | Approximate value of degree (n) of polymerization | |
|---|---|---|
| Molecular weight | Chemical formula 8 | Chemical formula 11 |
| $5.0 \times 10^4$ | 126.8 | 103.2 |
| $10.0 \times 10^4$ | 253.5 | 206.4 |
| $15.0 \times 10^4$ | 380.3 | 309.6 |
| $20.0 \times 10^4$ | 507.1 | 412.8 |

Note:
The degrees (n) of polymerization were obtained as approximate values. The reason is that the degrees (n) of polymerization for the representative molecular weights are not integers because the molecular weights of the monomers contain fractional numbers as shown in Table 4 above.

(3) Examples of the methods for controlling the molecular weight of a polyimide resin include varying the polymerization reaction conditions (temperature, duration, and viscosity), varying the charging ratio of the source material monomers (acid dianhydride and diamine), and varying the method of adding a polymerization inhibitor in the polymerization reaction (e.g., the amount of the addition and the timing of the addition). Specific examples of the methods that are used commonly to reduce the molecular weight include: reducing the time and increasing the viscosity as an example of varying the polymerization reaction conditions, charging either one of acid dianhydride or diamine in an excess amount as an example of varying the charging ratio of the source material monomers, and adding a polymerization inhibitor at the time of the polymerization reaction.

The present invention is suitable for driving power sources for mobile information terminals such as mobile telephones, notebook computers, and PDAs, especially for use in applications that require a high capacity. The invention is also expected to be used for high power applications that require continuous operations under high temperature conditions, such as HEVs and power tools, in which the battery operates under severe operating environments.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A lithium secondary battery comprising:
a positive electrode; a negative electrode comprising a negative electrode current collector and a negative electrode active material layer formed on the negative electrode current collector, the negative electrode active material layer comprising a binder and negative electrode active material particles containing silicon and/or a silicon alloy; a separator interposed between the electrodes; an electrode assembly comprising the positive electrode, the negative electrode, and the separator; and a non-aqueous electrolyte impregnated in the electrode assembly, wherein
the negative electrode binder contains a polyimide resin having a structure represented by the following chemical formula (1), and the polyimide resin has a weight average molecular weight of from 50,000 to less than 150,000 and has a molecular weight distribution such that the weight ratio of a polyimide resin having a molecular weight of less than 100,000 and a polyimide resin having a molecular'weight from 100,000 to less than 200,000 is from 50:50 to 90:10:

Chemical formula (1)

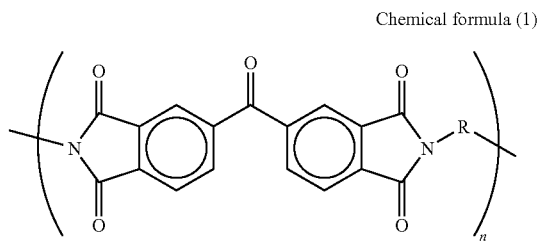

where n is an integer equal to or greater than 1, and R is a functional group represented by the following chemical formula (2) or (3):

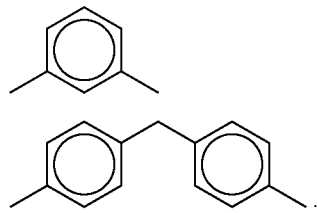

Chemical formula (2)

Chemical formula (3)

2. The lithium secondary battery according to claim 1, wherein the negative electrode current collector comprises copper or a copper alloy.

3. The lithium secondary battery according to claim 2, wherein the negative electrode current collector has a surface roughness Ra of from 0.2 μm to 0.5 μm.

4. The lithium secondary battery according to claim 1, wherein the negative electrode current collector has a surface roughness Ra of from 0.2 μm to 0.5 μm.

* * * * *